S. F. PIERCE.
PASTRY COOKING MACHINE.
APPLICATION FILED SEPT. 29, 1910.
985,204.
Patented Feb. 28, 1911.
2 SHEETS—SHEET 2.
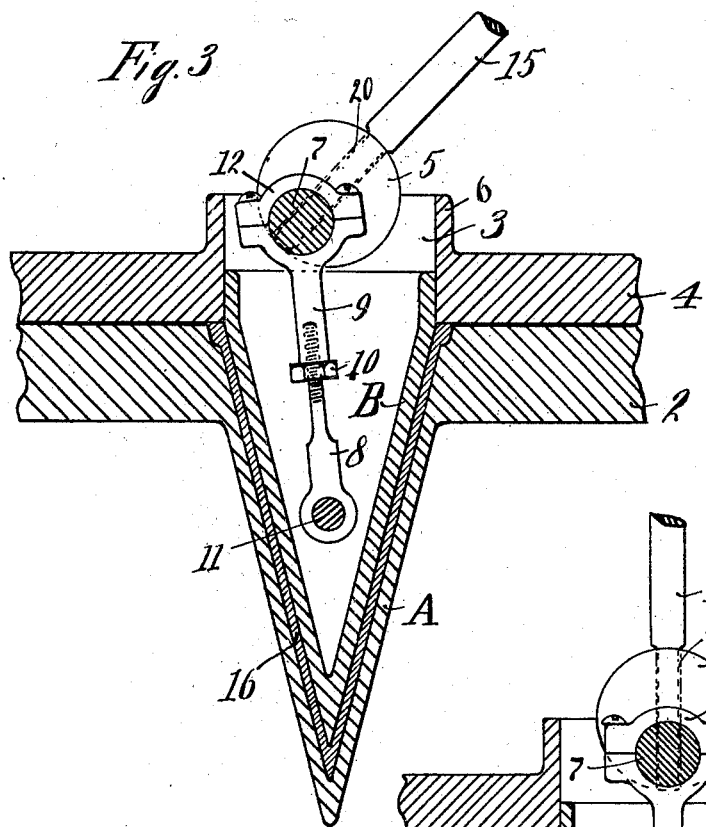
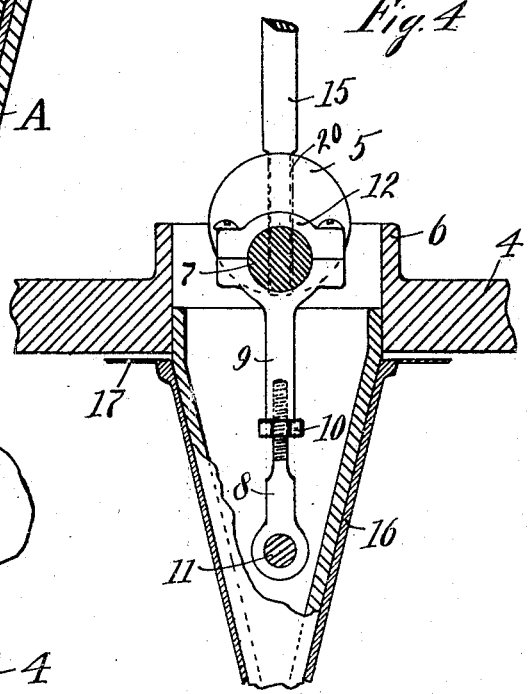
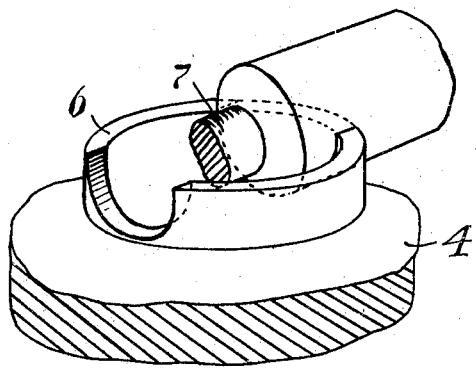
Witnesses,
George Voelker
Td. Smith
Inventor,
Simeon F. Pierce
by Lothrop & Johnson
his Attorneys

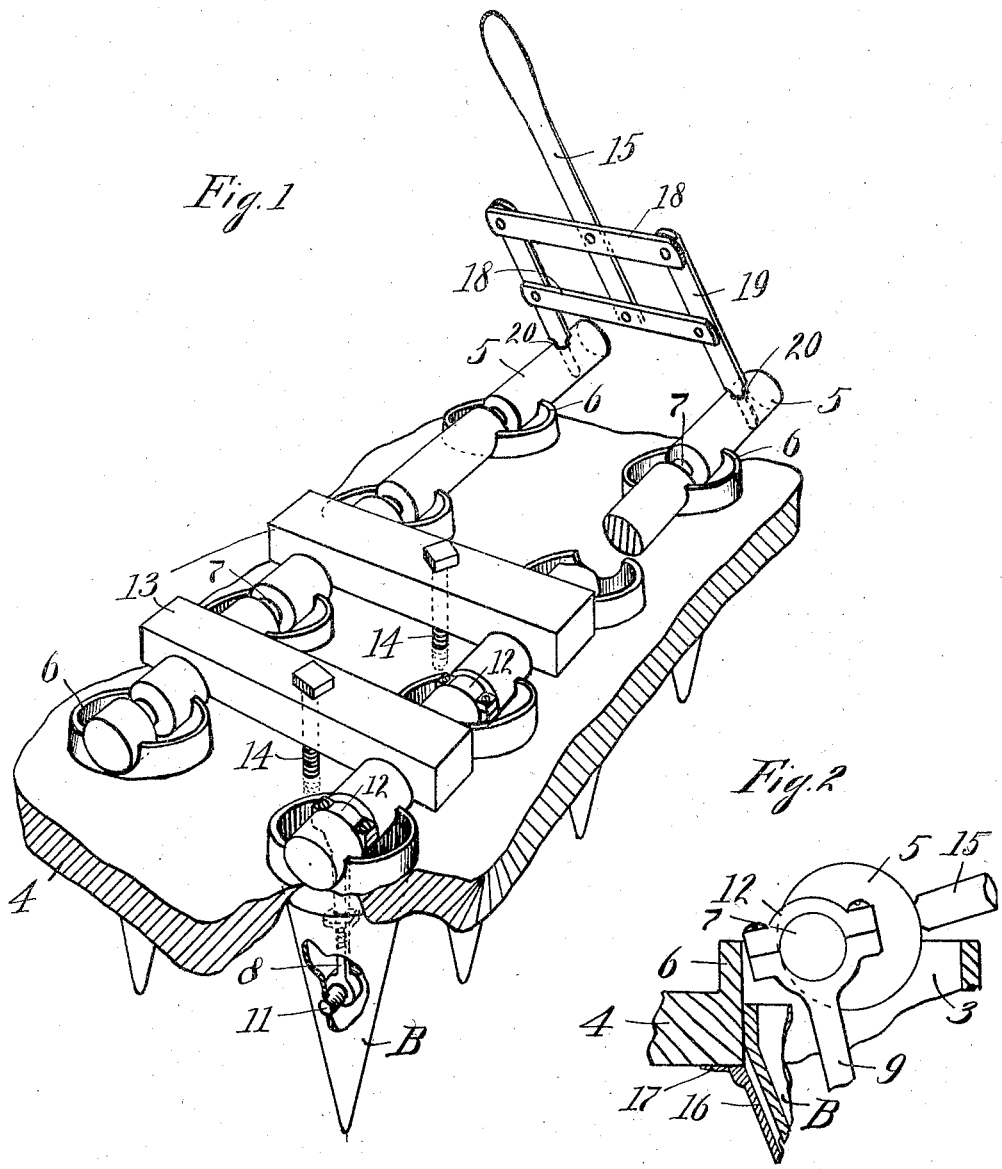

UNITED STATES PATENT OFFICE.

SIMEON F. PIERCE, OF ST. PAUL, MINNESOTA, ASSIGNOR TO CREAM CONE MACHINE COMPANY, OF ST. PAUL, MINNESOTA, A CORPORATION OF MINNESOTA.

PASTRY-COOKING MACHINE.

985,204.  Specification of Letters Patent.  Patented Feb. 28, 1911.

Application filed September 29, 1910. Serial No. 584,481.

*To all whom it may concern:*

Be it known that I, SIMEON F. PIERCE, a citizen of the United States, residing at St. Paul, in the county of Ramsey and State of Minnesota, have invented certain new and useful Improvements in Pastry-Cooking Machines, of which the following is a specification.

My invention relates to improvements in that class of pastry cooking machinery in which hollow articles of pastry as ice cream cones are molded between mold members and consists of improved means for actuating one of the mold members to remove the cooked article.

To this end my invention consists in the features of construction, combination and arrangement of parts hereinafter described and claimed.

In the accompanying drawings forming part of this specification, Figure 1 is a perspective view of a plurality of mold members including my improved actuating means for the inner mold members; Figs. 2 and 3 are central vertical sections through coöperating mold members showing the inner mold member in varying positions; Fig. 4 is a similar section through the inner mold member and surrounding framework illustrating one step in the operation of loosening the cooked pastry; and Fig. 5 is a perspective view broken away of an actuating cam for the inner mold members.

In the drawings A represents outer mold members carried by the wall 2 of an oven not shown.

B represents inner mold members slidably supported in openings 3 in a plate 4, which plate may be supported in any suitable manner, not shown, to carry the inner mold members B into and out of the outer mold members.

For the purpose of loosening the cooked pastry from the inner mold members, I provide the following described features of invention: Arranged longitudinally of the plate 4 above each row of inner mold members is a shaft 5 having journal support in flanges 6 surrounding the openings 3. The shaft 5 above each inner mold member is cut away to form an eccentric 7. Each eccentric 7 is connected with the interior of the corresponding inner mold member by links 8 and 9 having screw threaded adjustable connection controlled by a nut 10. The link 8 has pivotal connection 11 with the interior of the inner mold member and the link 9 is supported at its upper end upon the corresponding eccentric 7 through the medium of a yoke 12. The shafts 5 are anchored and braced upon the plate 4 by means of cross bars 13, said cross bars being centrally secured as by bolts 14 to the plate and forming journal supports at their free ends for the shafts. For the purpose of rotating the shafts to actuate the inner mold members I provide a suitable handle 15. The handle 15 pivotally supports a pair of cross arms 18 which in turn pivotally support bars 19 which are narrowed at their ends to fit into openings 20 in the ends of the bars 5. The handle 15 may thus be removed when not in use. By varying the number of bars 18 and 19 the handle may be adapted to any number of shafts 5.

In operation the pastry article 16 is obtained, as in the general class of machinery of this type, by dough being poured into the outer mold members, the inner mold members then being carried into the outer mold members to shape the pastry and the whole then subjected to suitable heat. The baked article as obtained by machines of this type comprises the pastry cones 16 connected at their larger ends by a sheet of pastry 17. In actual operation it is found that when the inner mold members are removed from the outer mold members the pastry cones 16 are apt to adhere to the inner mold members and the sheet of pastry 17 to the underside of the plate 4. The articles being of thin pastry are easily broken unless great care is used in their removal and to accomplish the removal of the cones and connecting sheet of pastry without injury my improved features are employed. In removing the cooked article I first rotate the shafts 5 by the handle 15 to slightly lower the inner mold members and loosen the sheet of pastry 17 from the underside of the plate 4. I then oppositely rotate the shafts 5 to raise the inner mold members in the openings 3 as illustrated in Fig. 2 to bring the large ends of the pastry cones against the underside of the plate and force said cones from the inner mold members.

This effectively and without injury loosens the pastry articles from the inner cone members.

I claim as my invention:

1. In a pastry cooking machine of the class described, a plurality of fixed outer mold members, a plurality of coöperating inner mold members slidably supported in connection with an adjacent support, and eccentric means for reciprocating said inner mold members to bring a predetermined portion of the same respectively below and above the underside of said support.

2. In a pastry cooking machine of the class described, a plurality of outer mold members, a superimposed plate, a plurality of inner mold members extending through said plate in position to enter said outer mold members and eccentric means supported by said plate for raising and lowering said mold members with relation to said plate.

3. In a pastry cooking machine of the class described, a plurality of outer mold members, a superimposed plate, a plurality of inner mold members slidably extending through said plate, means supported by said plate for sliding said inner mold members with relation to said plate, and means for adjusting the position of said inner mold members with reference to said actuating means.

4. In a pastry cooking machine of the class described, a plurality of fixed outer mold members, a superimposed plate, shafts having journal support upon said plate, eccentrics carried by said shafts, and slidable inner mold members extending through said plate and supported from said eccentrics.

5. In a pastry cooking machine of the class described, a plurality of fixed outer mold members, a superimposed plate, a plurality of eccentrics supported by said plate, means for actuating said eccentrics, and slidable inner mold members extending through said plate and adjustably supported from said eccentrics.

In testimony whereof I affix my signature in presence of two witnesses.

SIMEON F. PIERCE.

Witnesses:
H. S. JOHNSON,
H. SMITH.